No. 880,324. PATENTED FEB. 25, 1908.
R. E. PARKER.
BALL BEARING WATER HEAD FOR DIAMOND DRILLS.
APPLICATION FILED NOV. 12, 1907.
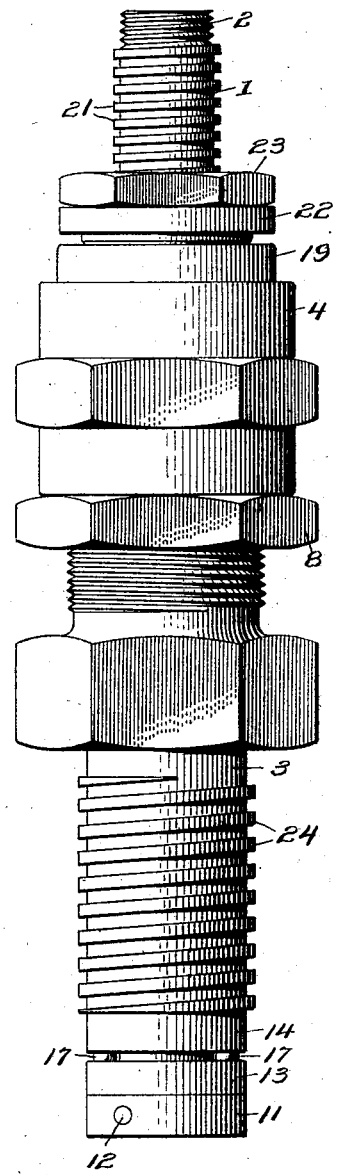
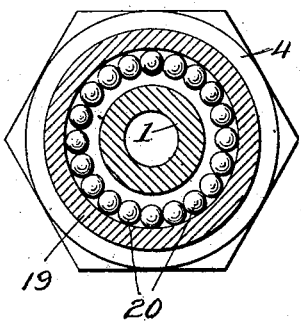
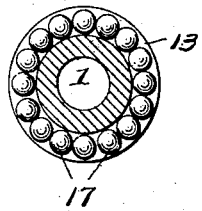
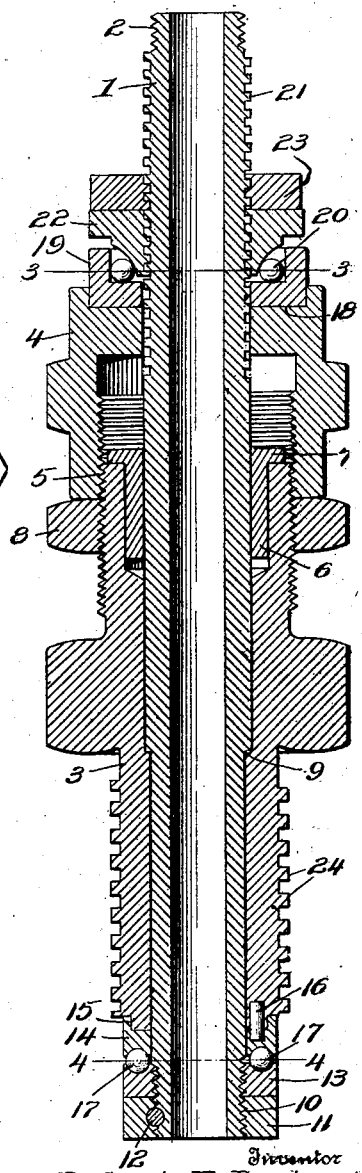
Inventor
Robert E. Parker.
Witnesses
F. C. Gibson.
P. M. Smith.
By Victor J. Evans
Attorney,

UNITED STATES PATENT OFFICE.

ROBERT E. PARKER, OF FLAT RIVER, MISSOURI.

BALL-BEARING WATER-HEAD FOR DIAMOND DRILLS.

No. 880,324.　　　Specification of Letters Patent.　　　Patented Feb. 25, 1908.

Application filed November 12, 1907. Serial No. 401,895.

*To all whom it may concern:*

Be it known that I, ROBERT E. PARKER, a citizen of the United States, residing at Flat River, in the county of St. Francois and State of Missouri, have invented new and useful Improvements in Ball-Bearing Water-Heads for Diamond Drills, of which the following is a specification.

This invention relates to ball bearing water heads for diamond drills, the object of the invention being to provide a device of the class referred to in which the parts which are ordinarily subjected to the greatest friction are so combined and associated that ball bearing may be applied thereto with the result that the major portion of the friction is done away with, thereby materially increasing the life and durability of the waterhead as a whole and also economizing in time and labor.

With the above and other objects in view the invention consists in the novel construction, combination and arrangement of parts as hereinafter fully described illustrated and claimed.

In the accompanying drawing, Figure 1 is an elevation of a waterhead embodying the present invention. Fig. 2 is a longitudinal section through the same. Fig. 3 is a cross section on the line 3—3 of Fig. 2. Fig. 4 is a cross section on the line 4—4 of Fig. 2.

Referring to the drawings 1 designates the center tube or tubular member of the waterhead which connects the drill rod with the water hose and which conducts the water therethrough to the drilling point of the bit. The center tube 1 is threaded at its upper end as indicated at 2 to permit the water hose to be connected thereto in the usual manner.

The main body of the water head comprises the main section 3 and an adjustable section 4, the same being threaded together as shown at 5, the section 4 being chambered and internally threaded to receive the interfitting externally threaded portion of the section 3. The section 3 is also chambered out in its inner end to receive a flanged packing collar 6 which is fitted therein as shown in Fig. 2, snugly surrounding the center tube 1 to prevent leakage and being flanged as shown at 7, the flange thereof resting against the extreme edge of the section 3 and being contained in the chamber of the section 4.

8 designates a jam nut which surrounds the threaded upper portion of the section 3 and locks against the adjacent end of the adjustable section 4. The inner tube 1 is provided with an annular shoulder 9 which bears against a corresponding annular shoulder within the head section 3.

The lower end of the center tube 1 is screw threaded as shown at 10 and threaded thereon is a fixed collar 11 which is prevented from rotating by means of a pin or key 12. Just above the collar 11 another collar 13 is threaded upon the center tube while above the collar 13 is still another collar 14 which is internally rabbeted as shown at 15 to embrace and engage the correspondingly rabbeted lower end of the section 3 and being locked to the sections 3 by means of one or more pins or dowels 16 whereby the collar 14 is caused to rotate with the section 3 of the waterhead. The collars 13 and 14 are provided in their adjacent faces with ball races in which is arranged a circular series of anti-friction balls 17.

The adjustable section 4 is provided in its upper end with a recess 18 in which is snugly fitted a ball cup 19 carrying a circular series of anti-friction balls 20. The upper end portion of the center tube 1 is threaded as shown at 21 to receive a ball cone 22 which bears against the anti-friction balls 20 as shown at Fig. 2 and provides for adjusting both sets of balls 17 and 20 at the same time. After the cone 22 has been adjusted to the proper point it is held by a lock nut 23 as shown in Fig. 2.

The lower end portion of the section 3 is screw-threaded as shown at 24 to receive the upper end of the drill rod (not shown) and it will be noted by reference to Figs. 1 and 2 that the collars 11, 13 and 14 are sufficiently smaller in diameter than the thread 24 to permit the internally threaded end of the drill rod to pass over the same in the operation of attaching and detaching the waterhead and the drill rod.

By means of the construction above described it is possible to provide a waterhead which may be coupled to the water hose and drill rod and yet embody anti-friction bearings which at the same time are adjustable for the purpose of taking up wear in the bearings. The value of this arrangement will be understood and appreciated by those familiar with the art to which the invention appertains in view of the fact that the drill rod is frequently driven at the rate of from 800 to 1000 revolutions per minute.

Having thus fully described the invention what is claimed as new is:

1. A waterhead comprising a center tube, a bearing head for the center tube having a ball race at one end thereof, a ball collar adjustable on said center tube in opposition to the bearing head, anti-friction balls interposed between the collar and head, and a ball bearing at the opposite end of the waterhead embodying collars carried by the head and center tube, and balls interposed between said collars.

2. A waterhead comprising relatively adjustable head sections, a ball cup on one of said sections, a center tube journaled in the head sections and having a threaded portion, a ball cone adjustable on said threaded portion in opposition to the ball cup, anti-friction balls between said cone and cup on the head section, a threaded extension on the other section of the head, a ball collar connected to said extension, another ball collar fast on the center tube, and anti-friction balls interposed between the two last named collars.

3. A water head comprising a center tube, a bearing head in which said tube is mounted comprising relatively adjustable sections having their adjacent ends chambered out and threaded together, a packing collar arranged within the chambered ends of said sections, ball bearings between the center tube and head at opposite ends of the latter, and means for adjusting said bearings substantially as described.

In testimony whereof I affix my signature in presence of two witnesses.

ROBERT E. PARKER.

Witnesses:
  CARROLL E. NORWINE,
  ANDREW J. NORWINE.